(12) United States Patent
Xiao et al.

(10) Patent No.: US 11,159,703 B2
(45) Date of Patent: Oct. 26, 2021

(54) SHOOTING INTERFACE SWITCHING METHOD AND APPARATUS, AND DEVICE AND STORAGE MEDIUM THEREOF

(71) Applicant: BEIJING XIAOMI MOBILE SOFTWARE CO., LTD., Beijing (CN)

(72) Inventors: Chunming Xiao, Beijing (CN); Qun Chang, Beijing (CN); Shang Gao, Beijing (CN); Ruyue Geng, Beijing (CN); Lifang Yu, Beijing (CN); Hai Long, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/557,418

(22) Filed: Aug. 30, 2019

(65) Prior Publication Data

US 2020/0128159 A1   Apr. 23, 2020

(30) Foreign Application Priority Data

Oct. 19, 2018  (CN) .......................... 201811224780.2

(51) Int. Cl.
    *H04N 5/225*     (2006.01)
    *H04M 1/02*     (2006.01)
    *H04N 5/232*     (2006.01)

(52) U.S. Cl.
    CPC ........ *H04N 5/2254* (2013.01); *H04M 1/0264* (2013.01); *H04N 5/2253* (2013.01);
(Continued)

(58) Field of Classification Search
    CPC ............... H04N 5/2254; H04N 5/2253; H04N 5/23225; H04N 5/23216; H04N 5/23245;
(Continued)

(56) References Cited

U.S. PATENT DOCUMENTS 8,878,890 B2 * 11/2014 Park ...................... G06F 1/1624
    348/14.02
10,440,275 B2 * 10/2019 Kim .................. H04N 5/23296
(Continued)

FOREIGN PATENT DOCUMENTS

| AU | 2014100583 B4 | 2/2015 |
|---|---|---|
| CN | 1920779 A | 2/2007 |

(Continued)

OTHER PUBLICATIONS

First Office Action issued to Chinese Application No. 201811224780.2 dated May 8, 2020 with English translation (14p).
(Continued)

*Primary Examiner* — Padma Haliyur
(74) *Attorney, Agent, or Firm* — Arch & Lake LLP

(57) ABSTRACT

The present disclosure provides a shooting interface switching method and apparatus, and a device and storage medium thereof, relating to the field of camera shooting technology. The method includes: displaying a first user interface that enables a shooting program to shoot a photo using a rear camera on a terminal; acquiring a first cover slide event indicating that the slide rear cover is slid out; and controlling, based on the first cover slide event, the shooting program to switch the first user interface to a second user interface that enables the shooting program to shoot a photo using a front camera.

17 Claims, 8 Drawing Sheets

(52) U.S. Cl.
CPC ..... *H04N 5/23216* (2013.01); *H04N 5/23225* (2013.01); *H04M 2201/42* (2013.01); *H04M 2250/52* (2013.01); *H04N 5/23245* (2013.01)

(58) Field of Classification Search
CPC ........... H04N 5/232061; H04N 5/2257; H04N 5/247; H04M 1/0264; H04M 2201/42; H04M 2250/52; H04M 1/72522; H04M 1/0245; H04M 1/0235; H04M 1/72525; H04M 1/72569; G06F 3/0487; G06F 3/0488; G06F 1/1624; G06F 1/1686
See application file for complete search history.

(56) References Cited

U.S. PATENT DOCUMENTS

| | | | |
|---|---|---|---|
| 2008/0176605 A1 | 7/2008 | Choi et al. | |
| 2010/0298032 A1* | 11/2010 | Lee | G06F 1/1677 455/566 |
| 2011/0050975 A1* | 3/2011 | Chung | H04M 1/0241 348/333.02 |
| 2017/0323279 A1* | 11/2017 | Dion | H04N 5/23206 |

FOREIGN PATENT DOCUMENTS

| | | |
|---|---|---|
| CN | 106547467 A | 3/2017 |
| CN | 107193453 A | 9/2017 |
| CN | 107819988 A | 3/2018 |
| CN | 207150658 U | 3/2018 |
| CN | 108304105 A | 7/2018 |
| CN | 108566455 A | 9/2018 |
| CN | 207910858 U | 9/2018 |
| EP | 3163845 A1 | 5/2017 |
| WO | 2019059895 A1 | 3/2019 |

OTHER PUBLICATIONS

Extended European Search Report of counterpart EP Application No. 19204103.6 dated Feb. 21, 2020, (xxp).
Williams Pelegin, "The Doogee Mix 4 features minimal bezels—Android Authority", Apr. 5, 2018, (9p).
Nguyen Lanh, "Xiaomi Mi Mix 3 review: The classic slider phone returns", Feb. 24, 2018, (24p).

* cited by examiner

SHOOTING INTERFACE SWITCHING METHOD AND APPARATUS, AND DEVICE AND STORAGE MEDIUM THEREOF

CROSS REFERENCE TO RELATED APPLICATION

This application is based upon and claims priority to Chinese Patent Application 201811224780.2, filed on Oct. 19, 2018, the entire contents of which are incorporated herein by reference.

TECHNICAL FIELD

Embodiments of the present disclosure relate to the field of camera shooting technology, and in particular, to a shooting interface switching method and apparatus, and a device and storage medium thereof.

BACKGROUND

At present, most commercially available smart phones are equipped with a front camera and a rear camera. The front camera is arranged on the side with the screen, and the rear camera is arranged on a rear side of the smart phone.

In the related art, after a user starts the camera on a smart phone, a user interface in which photos are shot by using the rear camera is generally displayed on the screen of the smart phone. In this case, the smart phone finds views and acquires images by using the rear camera. The user interface is further provided with a switching button control. If the user desires to shoot a photo by using the front camera, the user may switch the rear camera to the front camera only by clicking the switching button control on the user interface. In this case, the smart phone finds views and acquires images by using the front camera, and a user interface in which photos are shot by using the front camera is displayed on the screen of the smart phone.

SUMMARY

Embodiments of the present disclosure provide a shooting interface switching method and apparatus, and a device and a storage medium thereof. The technical solutions are as follows:

According to the first aspect of the present disclosure, there is provided a shooting interface switching method, the method comprising: displaying a first user interface that enables a shooting program to shoot a photo using the rear camera on the terminal; acquiring a first cover slide event indicating that the slide rear cover is slid out; and controlling, based on the first cover slide event, the shooting program to switch the first user interface to a second user interface that enables the shooting program to shoot a photo by using the front camera.

According to the second aspect of the present disclosure, there is provided a shooting interface switching apparatus, the apparatus comprising: a processor; and a memory arranged to store an instruction executable by the processor. The processor is arranged to: display a first user interface that enables a shooting program to shoot a photo using the rear camera on the terminal; acquire a first cover slide event indicating that the slide rear cover is slid out; and control, based on the first cover slide event, the shooting program to switch the first user interface to a second user interface that enables the shooting program to shoot a photo using the front camera.

According to the third aspect of the present disclosure, there is provided a non-transitory computer-readable storage medium having stored therein instructions that, when executed by a processor, causes the processor to perform a shooting interface switching method, the method being applied to a terminal with a front camera and a rear camera being respectively arranged on a front surface and a rear surface of a slide rear cover, and the method comprising: displaying a first user interface that enables a shooting program to shoot a photo using the rear camera on the terminal; acquiring a first cover slide event indicating that the slide rear cover is slid out; and controlling, based on the first cover slide event, the shooting program to switch the first user interface to a second user interface that enables the shooting program to shoot a photo using the front camera.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The present disclosure will be described in further detail with reference to the accompanying drawings, to present the objects, technical solutions, and advantages of the present disclosure clearer.

The employing of full screen display changes the position of the front camera of a terminal. Some front cameras are arranged inside the terminal, and the front camera may eject out from the edge when a related function is enabled.

Figure 1:
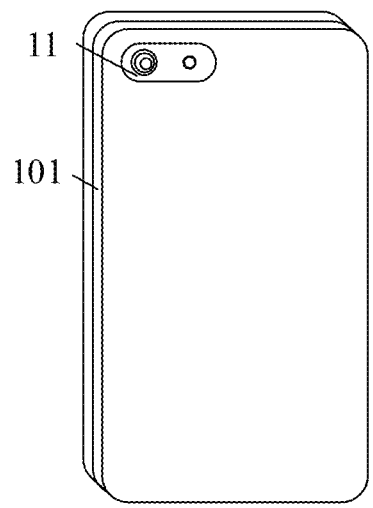
FIG. 1 is a structural diagram of a terminal according to one aspect of the present disclosure.
Figure 2:
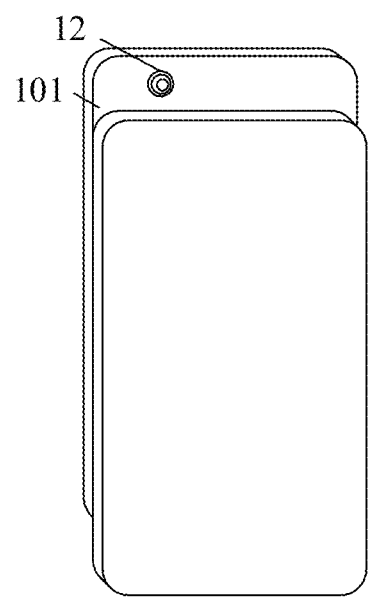
FIG. 2 is a structural diagram of a terminal according to another aspect of the present disclosure.

Another solution of employing the front camera of the terminal supporting full screen display is separating the front camera from the screen by a slide rear cover. In a cover type terminal, the front camera and the rear camera are respectively arranged on a front surface and a rear surface of the slide rear cover. Reference may be schematically made to a rear side view as illustrated in FIG. 1. The terminal is provided with a slide rear cover 101, wherein a rear camera 11 is arranged on the rear surface of the slide rear cover 101. Referring to a front side view as illustrated in FIG. 2, when the slide rear cover 101 is upwardly (or downwardly) slid out, the front surface of the slide rear cover 101 is provided with a front camera 12.

During the use of the slide-cover terminal, after a user starts a shooting program, generally a first user interface in which the shooting program shoots a photo by using the rear camera 11 is displayed on the screen of the terminal. If the user desires to shoot and acquire an image by using the front camera 12, the user needs to slide out the slide rear cover 101 firstly, and then click a switching button control on the first user interface to switch the first user interface to a second user interface in which the shooting program shoots a photo by using the front camera. The steps are as follows:

1. starting the shooting program, and displaying the first user interface on the terminal;
2. sliding out the slide rear cover; and
3. clicking a switching button control, to switch from the first user interface to the second user interface.

In the above process, switching of the user interface may be completed through at least three steps. However, switching of the user interface on a terminal where the front camera is arranged on the screen thereof may be completed through two steps:

1. starting the shooting program, and displaying the first user interface on the terminal; and
2. clicking the switching button control, to switch from the first user interface to the second user interface.

As such, when the slide-cover terminal shoots the photo by using the front camera, the user interface switching steps are more complicated.

To solve the technical problem that the above steps are complicated, the present disclosure provides a shooting interface switching method and apparatus, and a device and storage medium thereof. The shooting interface switching method and apparatus, and the device and the storage medium thereof are described with reference to the embodiments hereinafter.

Figure 3:
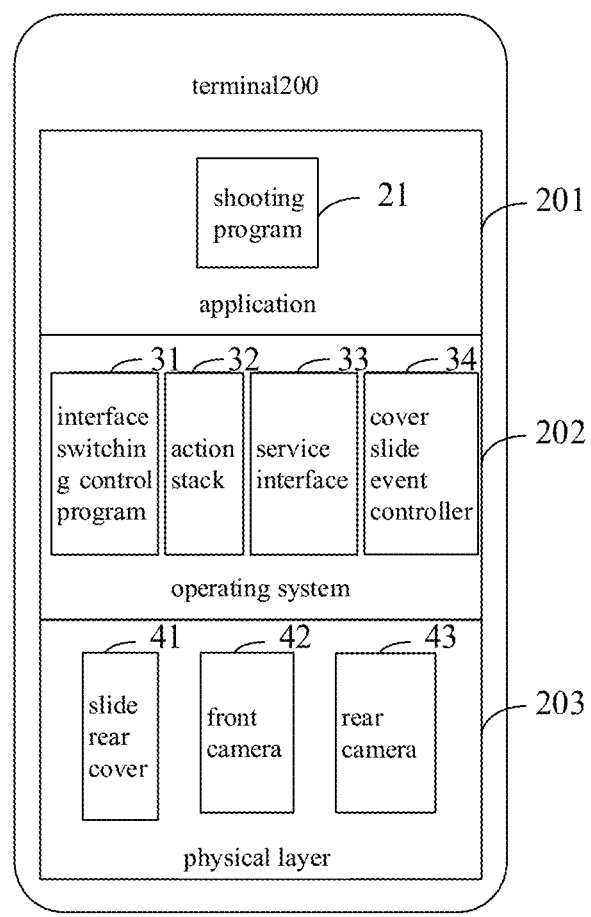
FIG. 3 is a structural diagram of a terminal according to another aspect of the present disclosure.

FIG. 3 is a structural diagram of a terminal according to an aspect of the present disclosure. The terminal 200 includes: an application layer 201, an operating system layer 202 and a physical layer 203.

A shooting program 21 is installed and ran on the application layer 201. The shooting program 21 may be a photo shooting program configured to execute an operation instruction sent by the operating system layer 202 and practice image shooting. For example, the shooting program 21 may be a shooting program originally equipped in the operating system, or a shooting program provided by a third party.

Optionally, the shooting program provided by the third party may be carried and installed in the operating system, or may be downloaded and installed by a user.

The shooting program originally equipped in the operating system may refer to a shooting program provided by a service provider that provides the operating system. The shooting program provided by the third party may refer to a shooting program provided by a third party service provider besides the service provider that provides the operating system; and the third party refers to a service provider besides the service provider that provides the operating system.

The operating system layer 202 is provided with an interface switching control program 31, an action stack 32, a service interface 33 of the slide rear cover and a cover slide event controller 24.

The interface switching control program 31 is a program block configured to control the shooting program 21 to switch the first user interface to the second user interface, or switch the second user interface to the first user interface. The first user interface is a user interface in which the shooting program shoots the photo by using a rear camera 43, and the second user interface is a user interface that enables the shooting program to shoot a photo by using a front camera 42.

The action stack 32 is a return stack configured to manage actions. The action is a component including the user interface, and is configured to implement interactions with the user. Each application may include a plurality of actions. The actions may be superimposed. Each time a new action is started, the newly started action can be superimposed over an original action. In the operating system, started actions are stored in the action stack 32. The action stack 32 is a last-in first-out data structure. By default, each time a new action is started, the new action can be pushed onto the action stack 32, and placed at the stack top of the action stack. The action at the stack top is an action active at the foreground. The action active at the foreground is a component corresponding to a user interface that is located at an uppermost layer. The user interface located at the uppermost layer is a user interface that is visible on the screen by the user when using the terminal. Exemplarily, in the present disclosure, the first user interface is displayed on the terminal, the component corresponding to the first user interface is at the stack top of the action stack 32; when the first user interface is switched to the second user interface, a new action is started in the operating system, that is, the component corresponding to the second user interface; the new action can be pushed onto the action stack, and the component corresponding to the second user interface is superimposed over the component corresponding to the first user interface. In this case, the component corresponding to the second user interface is at the stack top of the action stack 32, and the second user interface is displayed on the screen of the terminal.

The service interface 33 of the slide rear cover is a service interface arranged in the operating system layer 202, and is used by the shooting program 21 to acquire state information of the slide rear cover.

The cover slide event controller 34 is configured to monitor slide-out and slide-in events of a slide rear cover 41, and send the slide-out and slide-in events of the slide rear cover 41 to the interface switching control program 31.

The physical layer 303 includes a slide rear cover 41, a front camera 42 and a rear camera 43. The front camera 42 and the rear camera 43 are respectively arranged on the front surface and the rear surface of the slide rear cover 41. Reference may be made to the exemplary description in FIG. 1 and FIG. 2, which is not described herein any further. The user slides the slide rear cover 41 to generate slide-out and slide-in events, and the cover slide event controller 34 monitors the generated slide-out and slide-in events and sends the slide-out and slide-in events to the interface switching control program 31. The front camera 42 and the rear camera 43 are configured to find views during image shooting.

Figure 4:
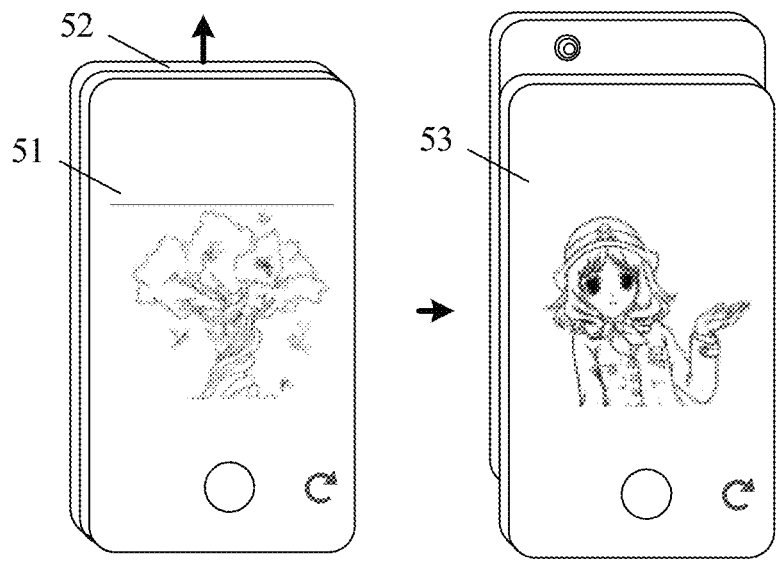
FIG. 4 is a schematic interface diagram of a shooting interface switching method according to one aspect of the present disclosure.

Exemplarily, the first user interface in which the shooting program 21 shoots the photo by using the rear camera 43 is displayed on the terminal; the user slides out the slide rear cover 41 and generates the first cover slide event; upon monitoring the first cover slide event, the cover slide event controller 34 sends the first cover slide event to the interface switching control program 31; and the interface switching control program 31 controls, based on the first cover slide event, the first user interface to the second user interface in which the shooting program 21 shoots the photo by using the front camera 42. Referring to FIG. 4, the user holds the terminal with his or her hand, makes one side of the screen to face him or her, and the rear side of the terminal to face towards the opposite direction. When a first user interface 51 is displayed on the terminal, the rear camera performs view finding, the object of view finding is a subject opposite to the rear camera. The first user interface includes a switching button control. When the user slides out the slide rear cover 52 upwardly in accordance with the direction indicated by an arrow and the first user interface 51 is switched to a second user interface 53, the front camera performs view finding. The front camera is opposite to the user, and therefore, an image of view finding is a portrait of the user.

Figure 5:
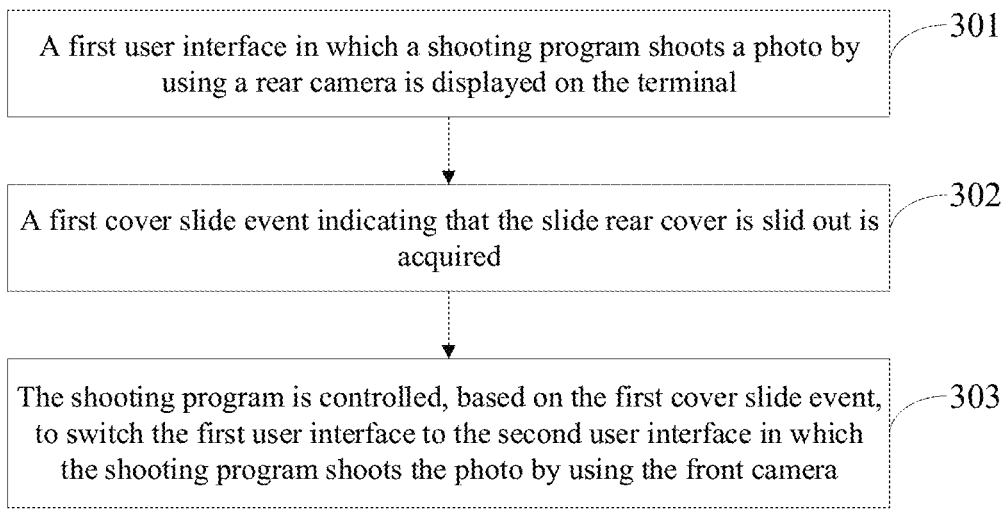
FIG. 5 is a flowchart of a shooting interface switching method according to one aspect of the present disclosure.

FIG. 5 is a flowchart of a shooting interface switching method according to an aspect of the present disclosure. Using a scenario where the method is applied to the terminal as illustrated in FIG. 3 as an example, the method includes the following steps:

Step 301: A first user interface is displayed on the terminal. In the first user interface, a shooting program may shoot a photo by using a rear camera. The first user interface may display previews of real time image data obtained by the rear camera. The first user interface may also include other preset buttons or menus for the user to shoot photos using the rear camera. In other words, the first use interface enables the shooting program to shoot a photo using the rear camera.

The terminal is provided with a slide rear cover. At least one front camera and at least one rear camera are arranged on the terminal. The at least one front camera and the at least one rear camera are disposed on a cover surface of the slide rear cover of the terminal.

The terminal is equipped with an operating system and a shooting program. The operating system is configured to control the shooting program to switch the first user interface to a second user interface.

Figure 6:
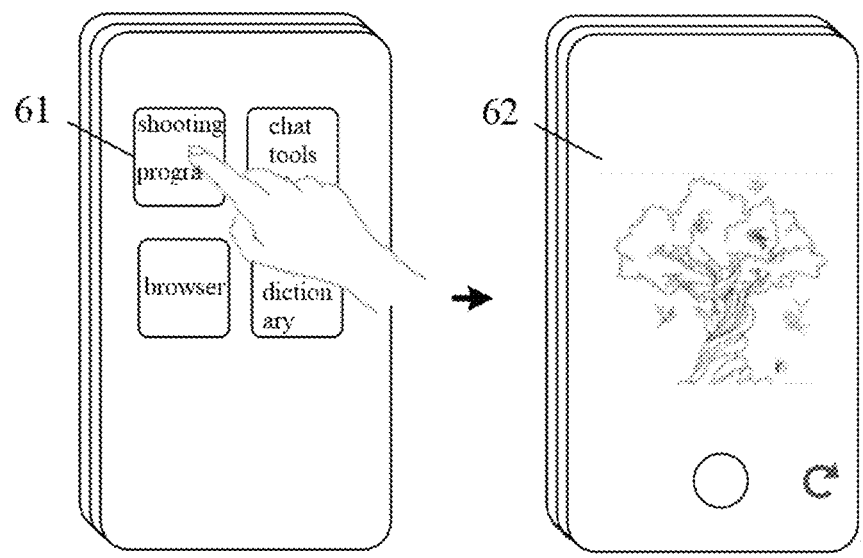
FIG. 6 is a schematic interface diagram of a shooting interface switching method according to another aspect of the present disclosure.

Exemplarily, referring to FIG. 6, a user starts a shooting program 61 on the terminal, and a first user interface 62 of the shooting program is displayed on the screen of the terminal by means of man-machine interaction. The first user interface 62 is a user interface for displaying an image for view finding when the shooting program shoots the photo by using the rear camera.

Step 302: A first cover slide event indicating that the slide rear cover is slid out is acquired.

The user slides out the slide rear cover, and the first cover slide event is generated on the terminal. The operating system acquires the first cover slide event indicating that the slide rear cover is slid out.

Step 303: The shooting program is controlled, based on the first cover slide event, to switch the first user interface to the second user interface in which the shooting program shoots the photo by using the front camera. In the second user interface, the display may show previews of real time image data obtained by the front camera. The second user interface may also include other preset buttons or menus for the user to shoot photos using the front camera. In other words, the second use interface enables the shooting program to shoot a photo using the front camera.

The operating system processes the first cover slide event, and obtains an event that is identifiable by the shooting program. The shooting program receives the event, calls the front camera based on the event, and switches the first user interface to the second user interface in which the shooting program shoots the photo by using the front camera. The second user interface is a user interface for displaying an image for view finding when the shooting program shoots the photo by using the front camera.

Optionally, prior to calling the front camera, the shooting program acquires state information of the slide rear cover and operating state information of the front camera by a service interface of the slide rear cover. When the slide rear cover is in a slid-out state, the front camera is in an open state. Upon determining that the front camera is in an idle state based on the operating state information, the shooting program calls the front camera, and switches the first user interface displayed on the screen to the second user interface. By the service interface of the slide rear cover, the shooting program acquires the state information of the slide rear cover and the operating state information of the front camera and the rear camera.

In summary, in the shooting interface switching method according to one or more embodiments, by displaying the first user interface in which the shooting program shoots the photo by using the rear camera on the terminal, acquiring the first cover slide event indicating that the slide rear cover is slid out, and controlling, based on the first cover slide event, the shooting program to switch the first user interface to the second user interface in which the shooting program shoots the photo by using the front camera, the step of manually switching the first user interface to the second user interface after the user slides out the slide rear cover is avoided, and man-machine interaction efficiency is improved.

It should be noted that the event that is identifiable by the shooting program may be a click simulation event generated when the operating system simulates the user to click the switching button control. Detailed description is given in the embodiment illustrated in FIG. 7 hereinafter.

Figure 7:
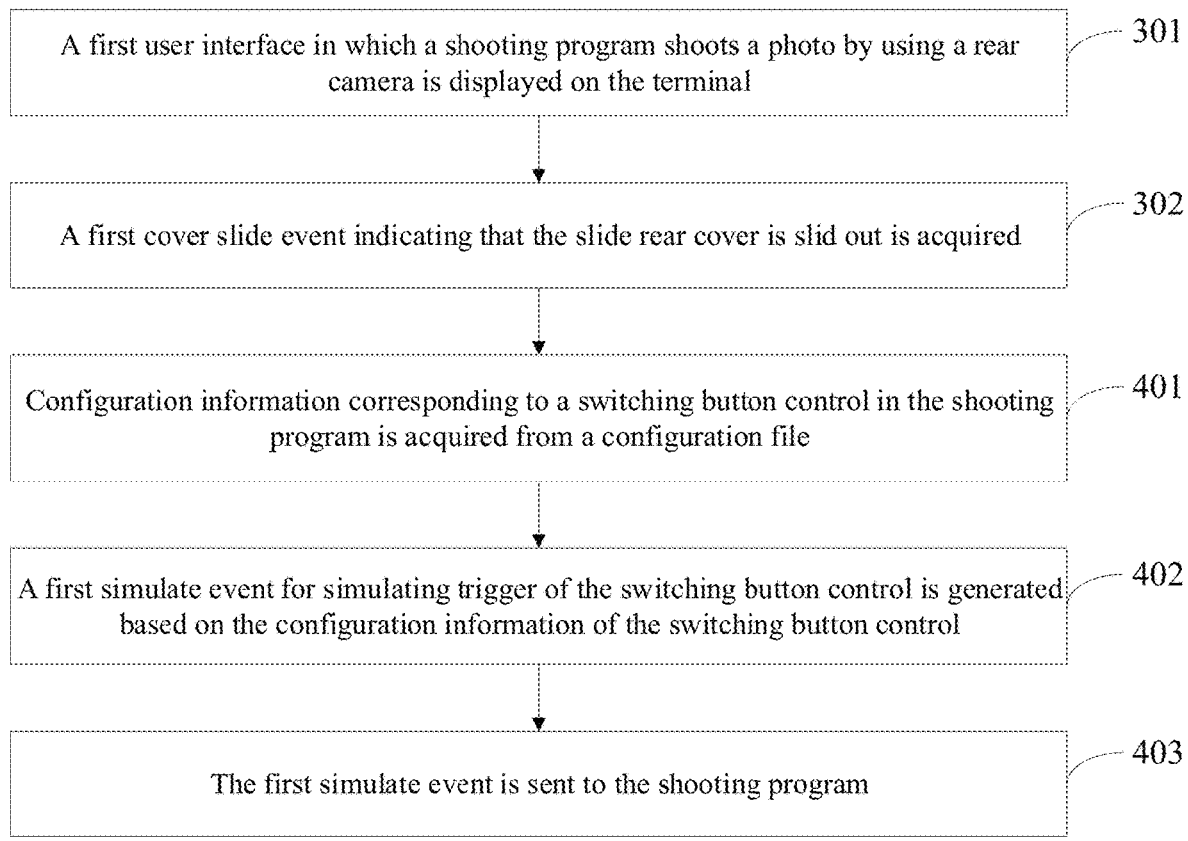
FIG. 7 is a flowchart of a shooting interface switching method according to another aspect of the present disclosure.

FIG. 7 is a flowchart of a shooting interface switching method according to another aspect of the present disclosure. Based on FIG. 5, step 303 is replaced by step 401 to step 403, and detailed description is given to a method of controlling the shooting program to switch the user interface by the operating system. The method includes the following steps:

Step 401: Configuration information corresponding to a switching button control in the shooting program is acquired from a configuration file.

The switching button control is a control for switchover between the front camera and the rear camera.

The configuration file is a configuration file defined in the operating system. The configuration file includes the configuration information corresponding to the switching button control. Optionally, the configuration information corresponding to the switching button control in the configuration file may be written into the configuration file after a programmer measures the configuration information corresponding to the switching button control in the shooting program by using a measurement tool, or may be written into the configuration file by the operating system and/or a background server by machine learning. Exemplarily, a machine learning model is configured in the operating system. When the user clicks the switching button control to switch the user interface, the operating system records at least one of interface positional information, identifying information and a version number of the switching button control clicked by the user, and inputs the interface positional information, and/or the identifying information, and/or the version number of the switching button control to the machine learning model. The machine learning model outputs a simulation event for simulating click of the switching button control. By the simulation event, the operating system controls the shooting program to switch the first user interface to the second user interface.

Optionally, the configuration information corresponding to the switching button control includes at least one of following parameters: the interface positional information of the switching button control, the identifying information of the switching button control, and the version number of the switching button control.

For example, referring to Table 1, the example configuration information includes interface positional information and identifying information of the switching button control, and different shooting programs correspond to different interface positional information and identifying information of the switching button control. For example, a shooting program 1 corresponds to interface positional information 1 and identifying information 1, and a shooting program 2 corresponds to interface positional information 2 and identifying information 2.

TABLE 1

| Shooting program | Interface positional information of switching button control | Identifying information of switching button control |
|---|---|---|
| Shooting program 1 | Interface positional information 1 | Identifying information 1 |
| Shooting program 2 | Interface positional information 2 | Identifying information 2 |

Referring to Table 2, the example configuration information includes the interface positional information, identifying information and version number of the switching button control, and different shooting programs correspond to different interface positional information, identifying information and version numbers of the switching button control. For example, a shooting program 3 corresponds to interface positional information 3, identifying information 3 and a version number 3, and a shooting program 4 corresponds to interface positional information 4, identifying information 4 and a version number 4. Alternatively, the same shooting program corresponds to different version numbers of the switching button control, and thus the interface positional information and identifying information of the switching button control may also be different. For example, the shooting program 4 may correspond to the version number 4 or a version number 5; when the shooting program 4 corresponds to the version number 4, the interface positional information and identifying information of the switching button control are the interface positional information 4 and identifying information 4, respectively. When the shooting program 4 corresponds to the version number 5, the interface positional information and identifying information of the switching button control are interface positional information 5 and identifying information 5, respectively.

TABLE 2

| Shooting program | Interface positional information of switching button control | Identifying information of switching button control | Version number of switching button control |
|---|---|---|---|
| Shooting program 3 | Interface positional information 3 | Identifying information 3 | Version number 3 |
| Shooting program 4 | Interface positional information 4 | Identifying information 4 | Version number 4 |
| Shooting program 4 | Interface positional information 5 | Identifying information 5 | Version number 5 |

Optionally, when the terminal is powered on, the operating system loads the configuration information stored in a configuration file.

The operating system includes an interface switching control program. Upon acquiring the first cover slide event, the interface switching control program acquires the configuration information corresponding to the switching button control in the shooting program from the configuration file.

Step 402: A first simulation event for simulating trigger of the switching button control is generated based on the configuration information of the switching button control.

The interface switching control program simulates a trigger event for trigger of the switching button control based on the configuration information of the switching button control, and generates the first simulation event.

The configuration information corresponding to the switching button control includes: interface positional information of the switching button control. The interface positional information is used for indicating positional coordinates of the switching button control on the first user interface.

Optionally, the interface switching control program generates, based on the interface positional information of the switching button control, a first simulation event for simulating click of the switching button control.

Optionally, the interface switching control program simulates a click event on the switching button control based on the interface positional information of the switching button control, and generates the first simulation event.

The first simulation event is a click simulation event generated based on the configuration information of the switching button control and the first cover slide event. The click simulation event is a click event generated by the operating system when the user clicks a screen position corresponding to the interface position of the switching button control on a touch screen, and is not a click event generated by a real clicking action from the user.

Step 403: The first simulation event is sent to the shooting program.

The first simulation event is used for triggering the shooting program to switch the first user interface to the second user interface.

The interface switching control program sends the first simulation event to the shooting program. The shooting program receives the first simulation event, that is, the shooting program receives the trigger event generated on the switching button control, and performs the subsequent processes based on the first simulation event. That is, the shooting program calls the front camera, and switches the first user interface to the second user interface.

In sum, in the shooting interface switching method according to one or more embodiments, by displaying the first user interface in which the shooting program shoots the photo by using the rear camera on the terminal, acquiring the first cover slide event indicating that the slide rear cover is slid out, generating the first simulation event based on the first cover slide event, controlling the shooting program to switch the first user interface to the second user interface by using the first simulation event, the step of manually switching the first user interface to the second user interface after the user slides out the slide rear cover is avoided, and man-machine interaction efficiency is improved.

Figure 8:
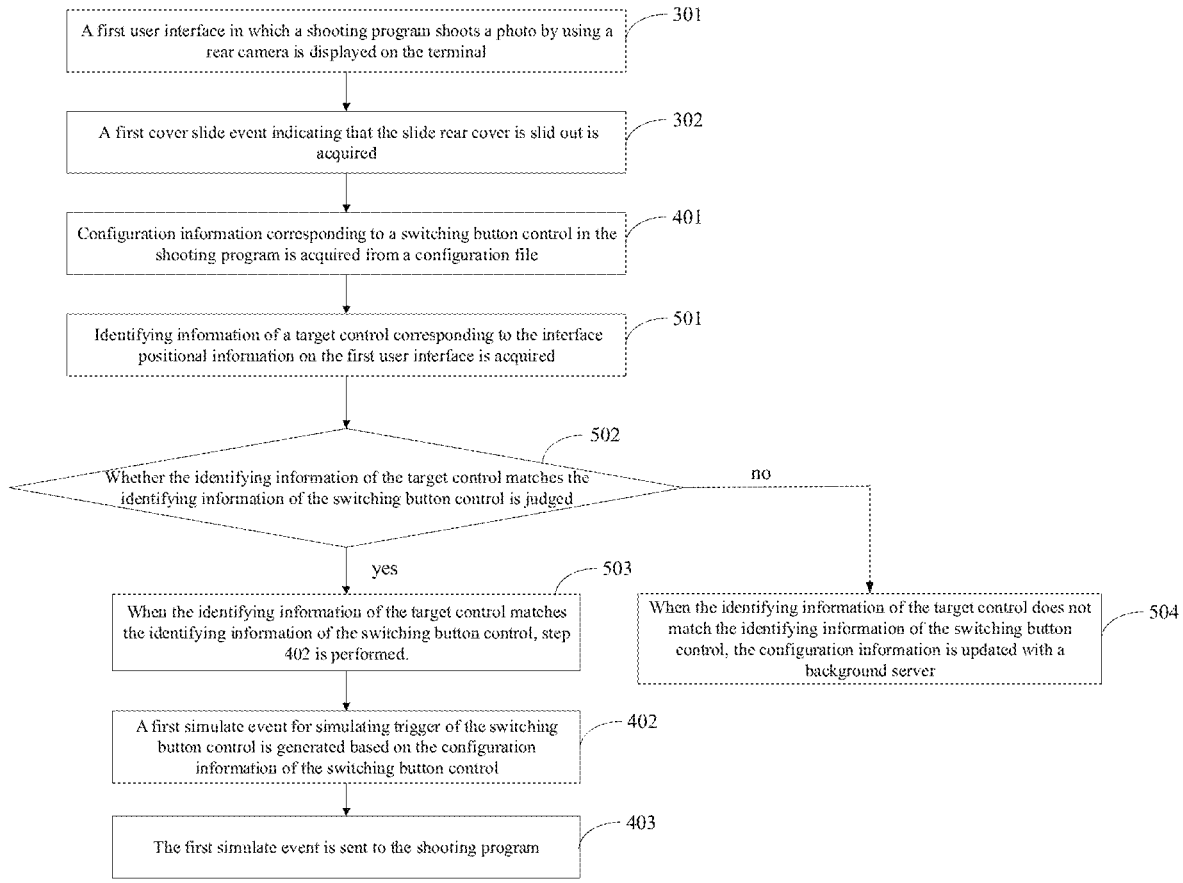
FIG. 8 is a flowchart of a shooting interface switching method according to another aspect of the present disclosure.

FIG. 8 is a flowchart of a shooting interface switching method according to another aspect of the present disclosure. Based on FIG. 7, step 501 to step 504 are added after step 401 to judge whether the configuration information of the switching button control matches the shooting program. The judgment includes the following steps:

Step 501: Identifying information of a target control corresponding to the interface positional information on the first user interface is acquired.

The configuration information corresponding to the switching button control includes the interface positional information and identifying information of the switching button control. The interface positional information is used for indicating the positional coordinates of the switching button control on the first user interface. The interface switching control program acquires identifying information of the target control at the positional coordinates indicated by the interface positional information of the switching button control on the first user interface.

Step 502: Whether the identifying information of the target control matches the identifying information of the switching button control is judged.

The identifying information of a control is a unique identification of the control. The interface switching control program judges whether the identifying information of the target control matches the identifying information of the switching button control. When the identifying information of the target control matches the identifying information of the switching button control, step 503 is performed; and when the identifying information of the target control does not match the identifying information of the switching button control, step 504 is performed.

Step 503: When the identifying information of the target control matches the identifying information of the switching button control, step 402 is performed.

Step 504: When the identifying information of the target control does not match the identifying information of the switching button control, the configuration information is updated with a background server.

The interface switching control program matches the identifying information of the target control with the identifying information of the switching button control. When the identifying information of the target control does not match the identifying information of the switching button control, it is determined that the version of the switching button control does not match the version of the configuration information, and feedback information indicating that the version of the switching button control does not match the version of the configuration information is sent to the background server. In this case, the programmer updates the configuration information corresponding to the switching button control based on the feedback information, and delivers updated configuration information corresponding to the switching button control to the terminal.

In summary, in the shooting interface switching method according to one or more embodiments, by displaying the first user interface in which the shooting program shoots the photo by using the rear camera on the terminal, acquiring the first cover slide event indicating that the slide rear cover is slid out, generating the first simulation event based on the first cover slide event, controlling the shooting program to switch the first user interface to the second user interface by using the first simulation event, the step of manually switching the first user interface to the second user interface after the user slides out the slide rear cover is avoided, and man-machine interaction efficiency is improved.

In the shooting interface switching method according to one or more embodiments, by matching the identifying information of the target control with the identifying information of the switching button control, determining that the target control is the switching button control in the shooting program and generating the first simulation event, it is ensured that the shooting program is capable of identifying the first simulation event, such that the subsequent processes are performed, and execution efficiency of the program is improved.

Figure 9:
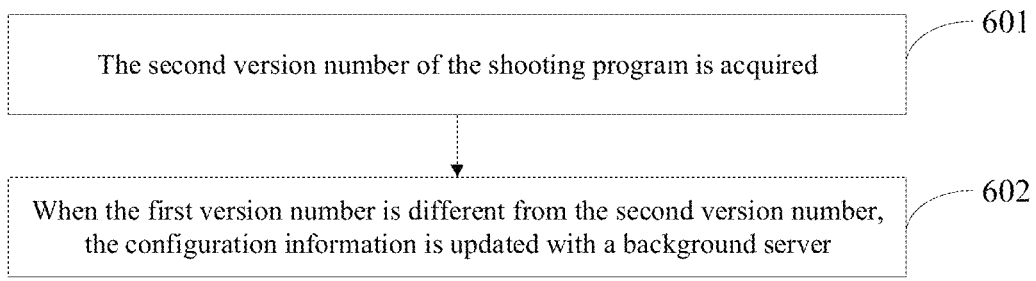
FIG. 9 is a flowchart of an update method of configuration information according to one aspect of the present disclosure.

It should be noted that when a first version number in the configuration information does not match a second version number of the shooting program, the configuration information needs to be updated. Update of the configuration information may be completed when the terminal is powered on or when the shooting program is started. Referring to FIG. 9, FIG. 9 is a flowchart of an update method of configuration information according to one aspect of the present disclosure. The method includes the following steps:

Step 601: The second version number of the shooting program is acquired.

Optionally, when the terminal is powered on, the operating system updates the configuration information corresponding to the switching button control; or when the shooting program is started, the interface switching control program in the operating system updates the configuration information corresponding to the switching button control.

In an optional embodiment, when the terminal is powered on, the operating system acquires the second version number of the shooting program.

In an optional embodiment, when the shooting program is started, the interface switching control program in the operating system acquires the second version number of the shooting program.

Step 602: When the first version number is different from the second version number, the configuration information is updated with a background server.

The configuration information corresponding to the switching button control includes the first version number.

When the first version number is different from the second version number, it is determined that the version of the shooting program does not match the version of the configuration information; and feedback information indicating that the version of the shooting program does not match the version of the configuration information is sent to the background server. In this case, the programmer updates the configuration information corresponding to the switching button control based on the feedback information, and delivers updated configuration information of the switching button control to the terminal.

In summary, in the shooting interface switching method according to one or more embodiments, by displaying the first user interface in which the shooting program shoots the photo by using the rear camera on the terminal, acquiring the first cover slide event indicating that the slide rear cover is slid out, generating the first simulation event based on the first cover slide event, controlling the shooting program to switch the first user interface to the second user interface by using the first simulation event, the step of manually switching the first user interface to the second user interface after the user slides out the slide rear cover is avoided, and man-machine interaction efficiency is improved.

In the shooting interface switching method according to one or more embodiments, by determining that the identifying information of the target control does not match the identifying information of the switching button control and timely updating the configuration information, it is ensured that the shooting program is capable of identifying the first simulation event, such that the subsequent processes are performed, and execution efficiency of the program is improved.

Figure 10:
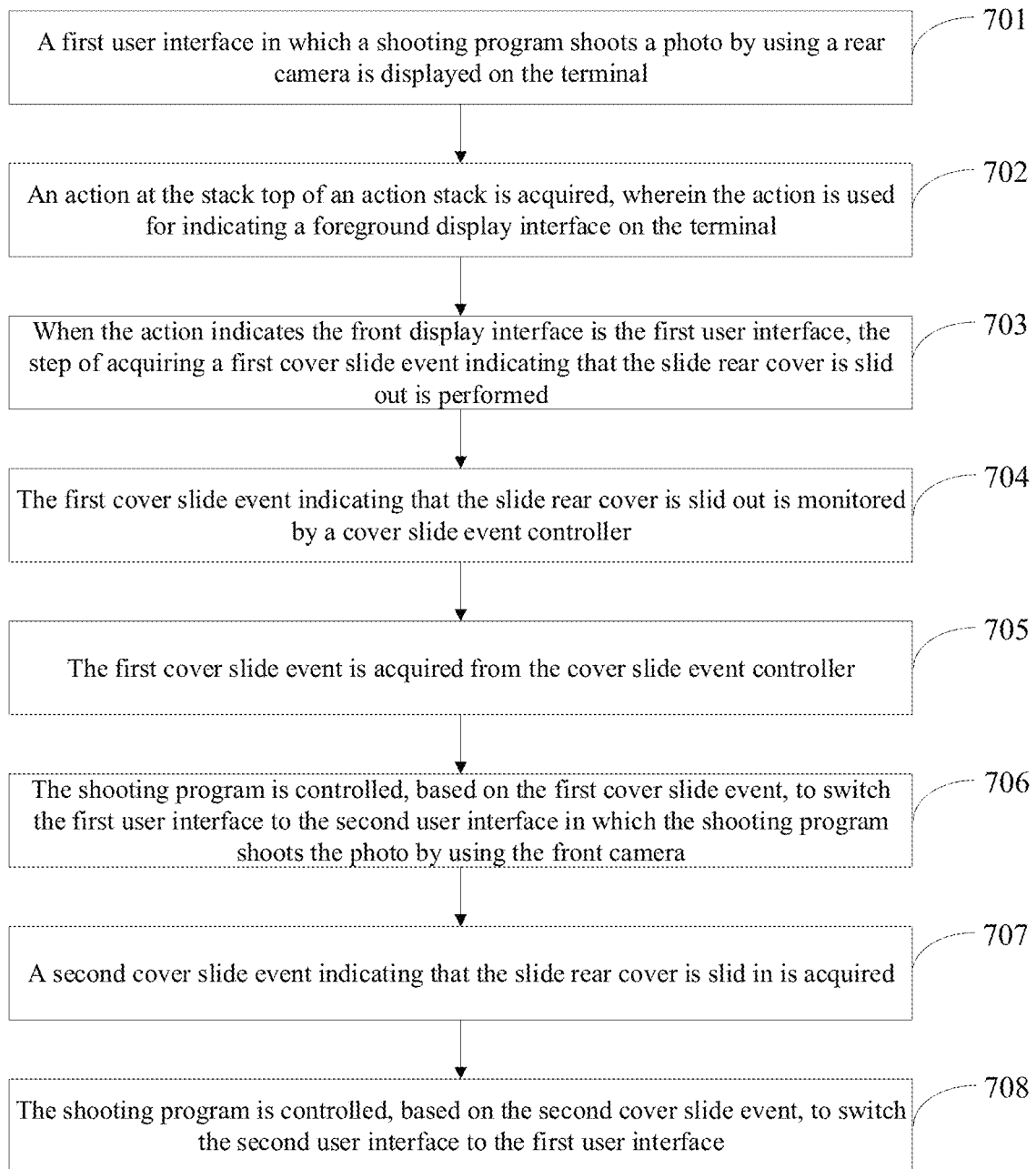
FIG. 10 is a flowchart of a shooting interface switching method according to another aspect of the present disclosure.

FIG. 10 is a flowchart of a shooting interface switching method according to another aspect of the present disclosure. Using a scenario where the method is applied to the terminal as illustrated in FIG. 3 as an example, the method includes the following steps:

Step 701: A first user interface in which a shooting program shoots a photo by using a rear camera is displayed on the terminal.

With respect to this step, reference may be made to step 301 in FIG. 5, which is not described herein any further.

Step 702: An action at the stack top of an action stack is acquired, wherein the action is used for indicating a foreground display interface on the terminal.

An interface switching control program acquires the action at the stack top of the action stack, and judges whether a foreground display interface on the terminal indicated by the action at the stack top of the action stack is the first user interface.

Step 703: When the action indicates the front display interface is the first user interface, the step of acquiring a first cover slide event indicating that the slide rear cover is slid out is performed.

Step 704: The first cover slide event indicating that the slide rear cover is slid out is monitored by a cover slide event controller.

The operating system includes a cover slide event controller and an interface switching control program. When a user slides out the slide rear cover, the first cover slide event is generated on the terminal. The cover slide event controller monitors the cover slide event.

Step 705: The first cover slide event is acquired from the cover slide event controller.

When the cover slide event controller monitors the first cover slide event, the interface switching control program acquires the first cover slide event indicating that the slide rear cover is slid out from the cover slide event controller.

Step 706: The shooting program is controlled, based on the first cover slide event, to switch the first user interface to the second user interface in which the shooting program shoots the photo by using the front camera.

With respect to this step, reference may be made to step 303 in FIG. 5, which is not described herein any further.

Step 707: A second cover slide event indicating that the slide rear cover is slid in is acquired.

The operating system includes a cover slide event controller and the interface switching control program. The user slides in the slide rear cover, and the second cover slide event is generated on the terminal. The cover slide event controller monitors the cover slide event. When the cover slide event controller monitors the second cover slide event, the interface switching control program acquires the second cover slide event indicating that the slide rear cover is slid out from the cover slide event controller.

Step 708: The shooting program is controlled, based on the second cover slide event, to switch the second user interface to the first user interface.

Optionally, the interface switching control program acquires the corresponding information of the switching button control in the shooting program from the configuration file; a second simulation event for simulating trigger of the switching button control is generated based on the configuration information of the switching button control; and the second simulation event is sent to the shooting program. The second simulation event is used for triggering the shooting program to switch the second user interface to the first user interface. After the shooting program receives the second simulation event, the second user interface is switched to the first user interface.

The configuration information corresponding to the switching button control includes: interface positional information of the switching button control. The interface positional information is used for indicating positional coordinates of the switching button control on the second user interface. Optionally, the method for generating the second simulation event includes: generating, by the interface switching control program based on the interface positional information of the switching button control, a second simulation event for simulating click of the switching button control.

In summary, in the shooting interface switching method according to one or more embodiments, by displaying the first user interface in which the shooting program shoots the photo by using the rear camera on the terminal, acquiring the first cover slide event indicating that the slide rear cover is slid out, and controlling, based on the first cover slide event, the shooting program to switch the first user interface to the second user interface in which the shooting program shoots the photo by using the front camera, the step of manually switching the first user interface to the second user interface after the user slides out the slide rear cover is avoided, and man-machine interaction efficiency is improved.

In the shooting interface switching method according to one or more embodiments, by monitoring the first cover slide event upon displaying the first user interface on the terminal and timely acquiring the first cover slide event, it is ensured execution efficiency of the shooting interface switching method according to the present disclosure. In addition, power consumption of the terminal is lowered relative to the scenario where the first cover slide event is monitored in the entire operation process of the terminal, and then the first cover slide event is monitored when the first user interface is displayed on the terminal and the sequent steps are performed.

In addition, in the shooting interface switching method according to one or more embodiments, by controlling the shooting program to switch the second user interface to the first user interface based on the second cover slide event indicating that the slide rear cover is slid in, the step of manually sliding in the slide rear cover after the user switches the first user interface to the second user interface is avoided, and man-machine interaction efficiency is improved.

For example, the terminal is equipped with a facial treatment camera; after the user starts the facial treatment camera, the user interface is a user interface in which the shooting program shoots the photo by using the rear camera; and if the user desires to shoots a photo thereof, the user needs to slide out the slide rear cover, click the switching button control and switch to a user interface in a self-portrait mode, that is, a user interface in which the photo is shot by using the front camera. In the shooting interface switching method according to one or more embodiments, the user only needs to slide out the slide rear cover, and the user interface can be automatically switched to the user interface in the self-portrait mode. Therefore, the man-machine interaction efficiency is improved.

Figure 11:
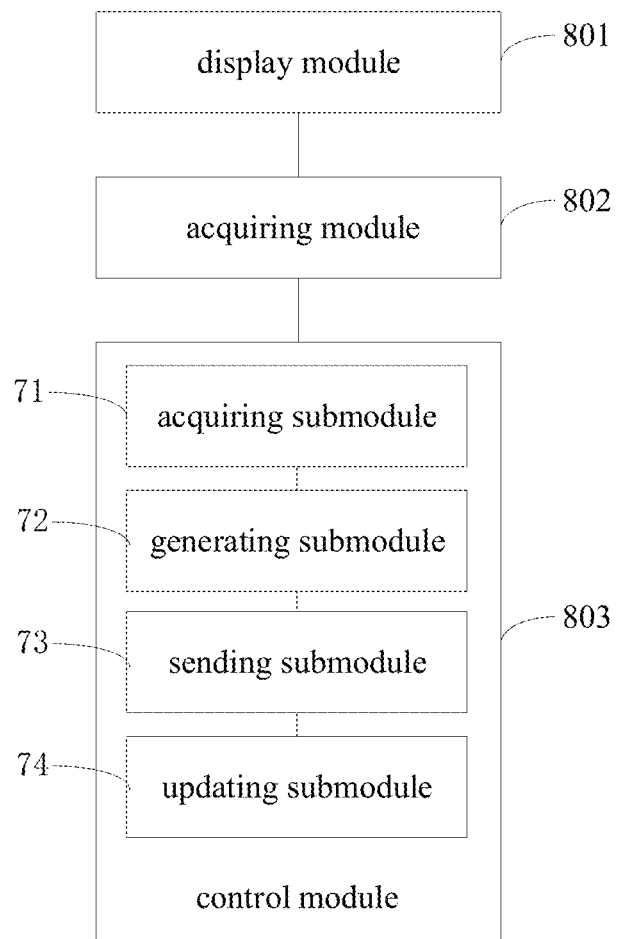
FIG. 11 is a block diagram of a shooting interface switching apparatus according to one aspect of the present disclosure.

FIG. 11 is a block diagram of a shooting interface switching apparatus according to one aspect of the present disclosure. The apparatus is implemented as a part or an entirety of the terminal by software or hardware or a combination of software and hardware. The apparatus includes:

a display module 801, configured to display a first user interface in which a shooting program shoots a photo by using a rear camera on a terminal;

an acquiring module 802, configured to acquire a first cover slide event indicating that a slide rear cover is slid out; and a control module 803, configured to control, based on the first cover slide event, the shooting program to switch the first user interface to a second user interface in which the shooting program shoots a photo by using a front camera.

In some embodiments, the control module 803 includes:

an acquiring submodule 71, configured to acquire configuration information corresponding to a switching button control in the shooting program from a configuration file, the switching button control being a control for switching between controls of the front camera and the rear camera;

a generating submodule 72, configured to generate, based on the configuration information of the switching button control, a first simulation event for simulating trigger of the switching button control; and a sending submodule 73, configured to send the first simulation event to the shooting program, the first simulation event being used for triggering the shooting program to switch the first user interface to the second user interface.

In some embodiments, the configuration information includes: interface positional information of the switching button control, wherein the interface positional information is used for indicating positional coordinates of the switching button control on the first user interface; and the generating submodule 72 is further configured to generate, based on the interface positional information of the switching button control, a first simulation event for simulating click of the switching button control.

In some embodiments, the configuration information includes: interface positional information and identifying information of the switching button control; and the control module 803 includes:

the acquiring submodule 71, further configured to acquire identifying information of a target control corresponding to the interface positional information on the first user interface; and the generating submodule 72, further configured to, when the identifying information of the target control matches the identifying information of the switching button control, perform the step of generating, based on the configuration information of the switching button control, a first simulation event for simulating trigger of the switching button control.

In some embodiments, the configuration information includes interface positional information and identifying information of the switching button control; and the control module 703 includes:

the acquiring submodule 71, further configured to acquire identifying information of a target control corresponding to the interface positional information on the first user interface; and a updating submodule 74, further configured to, when the identifying information of the target control does not match the identifying information of the switching button control, update the configuration information with a background server.

In some embodiments, the configuration information includes: a first version number; and the control module 803 includes:

the acquiring submodule 71, further configured to acquire a second version number of the shooting program; a updating submodule 74, further configured to, when the first version number is different from the second version number, update the configuration information with a background server.

In some embodiments, the acquiring module 802 is further configured to monitor the first cover slide event indicating that the slide rear cover is slid out by a cover slide event controller, and acquire the first cover slide event from the cover slide event controller.

In some embodiments, the apparatus further includes:

the acquiring module 802, further configured to acquire an action at the stack top of an action stack, the action being used for indicating a foreground display interface on the terminal; and when the action indicates the foreground display interface is the first user interface, perform the step of acquiring a first cover slide event indicating that the slide rear cover is slid out.

In some embodiments, the apparatus further includes:

the acquiring module 802, further configured to acquire a second cover slide event indicating that the slide rear cover is slid in; and the control module 803, further configured to control, based on the second cover slide event, the shooting program to switch the second user interface to the first user interface.

In summary, in the shooting interface switching apparatus according to one or more embodiments, by displaying the first user interface in which the shooting program shoots the photo by using the rear camera on the terminal, acquiring the first cover slide event indicating that the slide rear cover is slid out, and controlling, based on the first cover slide event, the shooting program to switch the first user interface to the second user interface in which the shooting program shoots the photo by using the front camera, the step of manually switching the first user interface to the second user interface after the user slides out the slide rear cover is avoided, and man-machine interaction efficiency is improved.

In the shooting interface switching apparatus according to one or more embodiments, by monitoring the first cover slide event upon displaying the first user interface on the terminal and timely acquiring the first cover slide event, it is ensured execution efficiency of the shooting interface switching method according to the present disclosure. In addition, power consumption of the terminal is lowered relative to the scenario where the first cover slide event is monitored in the entire process where the terminal is operating, and then the first cover slide event is monitored when the first user interface is displayed on the terminal and the sequent steps are performed.

In addition, in the shooting interface switching apparatus according to one or more embodiments, the configuration information can also be updated timely. This ensures that the shooting program is capable of identifying the first simulation event, and the subsequent processes are performed. Therefore, execution efficiency of the program is improved.

An aspect of the present disclosure provides a shooting interface switching apparatus, which may implement the shooting interface switching method provided by the present disclosure, the shooting interface switching apparatus comprising: a processor and a memory arranged to store an instruction executable by the processor.

The processor is arranged to: display a first user interface in which a shooting program shoots a photo by using the rear camera on the terminal; acquire a first cover slide event indicating that the slide rear cover is slid out; and control, based on the first cover slide event, the shooting program to switch the first user interface to a second user interface in which the shooting program shoots a photo by using the front camera.

Figure 12:
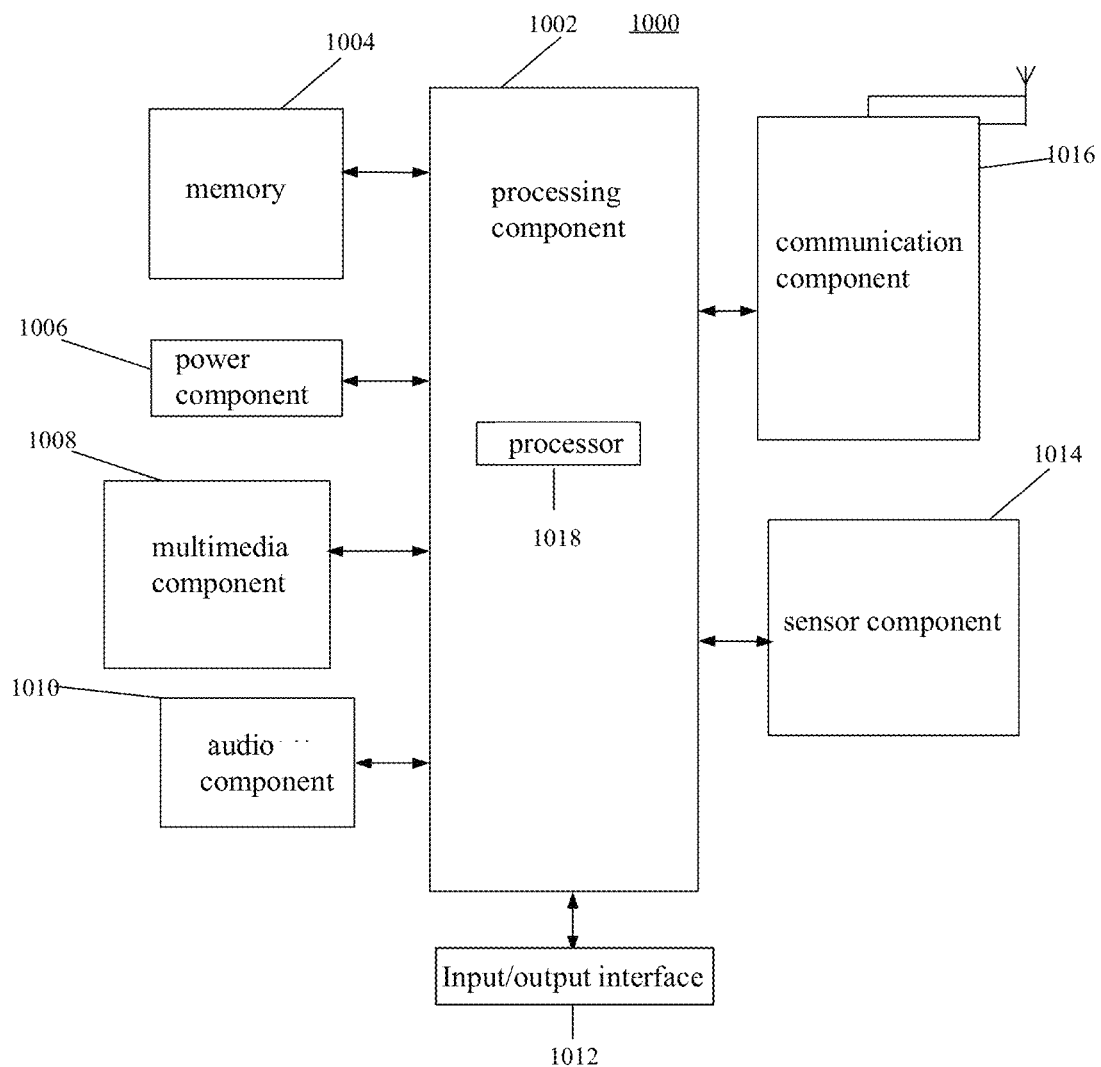
FIG. 12 is a block diagram of a shooting interface switching apparatus according to another aspect of the present disclosure.

FIG. 12 is a block diagram of a shooting interface switching apparatus 1000 shown according to another aspect of the present disclosure. For example, the apparatus 1000 may be a mobile phone, a computer, a digital broadcast terminal, a messaging device, a gaming console, a tablet device, a medical device, a fitness equipment, a personal digital assistant, and the like.

Referring to FIG. 12, the apparatus 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls the overall operations of the apparatus 1000, such as the operations associated with display, telephone calls, data communications, camera operations, and recording operations. The processing component 1002 may include one or more processors 1018 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the apparatus 1000. Examples of such data include instructions, contact data, phonebook data, messages, pictures, videos and the like for any programs or methods operated on the apparatus 1000. The memory 1004 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the apparatus 1000. The power component 1006 may include a power management system, one or more power sources, and any other components associated with the generation, management, and distribution of power in the apparatus 1000.

The multimedia component 1008 includes a screen providing an output interface between the apparatus 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 1008 includes a front camera and/or a rear camera. The front camera and the rear camera may receive external multimedia data while the apparatus 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone (MIC). The microphone configured to receive external audio signals when the apparatus 1000 is in an operation mode, such as a call mode, a recording mode and a voice recognition mode. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and peripheral interface modules, such as a keyboard, a click wheel, buttons, and the like. The buttons may include, but are not limited to, a home button, a volume button, a start button, and a lock button.

The sensor component 1014 includes one or more sensors to provide status assessments of various aspects of the apparatus 1000. For instance, the sensor component 1014 may detect an on/off status of the apparatus 1000, relative positioning of components, e.g., the display device and the mini keyboard of the apparatus 1000. The sensor component 1014 may also detect a position change of the apparatus 1000 or a component of the apparatus 1000, presence or absence of user contact with the apparatus 1000, orientation or acceleration/deceleration of the apparatus 1000, and temperature change of the apparatus 1000. The sensor component 1014 may include a proximity sensor configured to detect the presence of nearby objects without any physical contact. The sensor component 1014 may also include a light sensor, such as a CMOS or CCD image sensor, used for imaging applications. In some embodiments, the sensor component 1014 may also include an accelerometer sensor, a gyroscope sensor, a magnetic sensor, a pressure sensor or a temperature sensor.

The communication component 1016 is configured to facilitate communication, wired or wirelessly, between the apparatus 1000 and other devices. The apparatus 1000 can access a wireless network based on a communication standard, such as WiFi, 2G or 3G, or a combination thereof. In an aspect, the communication component 1016 receives broadcast signals or broadcast associated information from an external broadcast management system via a broadcast channel. In an aspect, the communication component 1016 further includes a near field communication (NFC) module to facilitate short-range communications.

In aspects, the apparatus 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, for performing the above described method embodiments of the shooting interface switching methods.

In aspects, a non-transitory computer-readable storage medium including instructions is also provided, such as the memory 1004 including instructions, executable by the processor 1018 in the apparatus 1000, for performing the above described method embodiments of the shooting interface switching methods. For example, the non-transitory computer-readable storage medium may be a ROM, a RAM, a CD-ROM, a magnetic tape, a floppy disc, an optical data storage device, and the like.

In aspects, there is further provided a computer-readable storage medium. The computer-readable storage medium is non-volatile computer-readable storage medium and stores therein computer programs that, when executed on a processing component, implement the shooting interface switching methods according to the embodiments of the present disclosure.

An embodiment of the present disclosure further provides a computer program product. The computer program product stores instructions, which, when being executed on a computer, cause the computer to perform the shooting interface switching methods according to the embodiments of the present disclosure.

An embodiment of the present disclosure further provides a chip. The chip includes a programmable logic circuit and/or a program instruction. The chip, when being ran, performs the shooting interface switching methods according to the embodiments of the present disclosure.

Other embodiments of the present disclosure can be available to those skilled in the art upon consideration of the specification and practice of the invention disclosed herein. The present application is intended to cover any variations, uses or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

It should be understood that this disclosure is not limited to the precise constructions described above and shown in the enclosed drawings, and various modifications and changes may be made without departing from the scope thereof. The scope of the present disclosure can be limited only by the appended claims.

What is claimed is:

1. A method for switching photo shooting interface, the method being applied to a terminal with a front camera and a rear camera being respectively arranged on a front surface and a rear surface of a slide rear cover, and the method comprising:

displaying a first user interface that enables a shooting program to shoot a photo using the rear camera on the terminal;

acquiring a first cover slide event indicating that the slide rear cover is slid out; and controlling, based on the first cover slide event, the shooting program to switch the first user interface to a second user interface that enables the shooting program to shoot a photo using the front camera, wherein the first user interface for the rear camera is switched to the second user interface for the front camera when a switching control program receives the first cover slide event upon monitoring the first cover slide event, and wherein controlling the shooting program to switch the first user interface to the second user interface comprises:

acquiring configuration information corresponding to a switching button control in the shooting program from a configuration file, the switching button control being a control for switching the front camera and the rear camera;

generating a first simulation event based on the configuration information of the switching button control, wherein the first simulation event is a click simulation event generated by an operating system when a user clicks a screen position corresponding to an interface position of the switching button control on a touch screen; and sending the first simulation event to the shooting program, the first simulation event being used for triggering the shooting program to switch the first user interface to the second user interface.

2. The method according to claim 1, wherein the configuration information comprises: interface positional information of the switching button control, the interface positional information being used for indicating positional coordinates of the switching button control on the first user interface; and generating the first simulation event based on the configuration information of the switching button control for simulating trigger of the switching button control comprises:

generating, based on the interface positional information of the switching button control, the first simulation event for simulating click of the switching button control.

3. The method according to claim 1, wherein the configuration information comprises: interface positional information and identifying information of the switching button control; and the method further comprises:

acquiring identifying information of a target control corresponding to the interface positional information on the first user interface; and when the identifying information of the target control matches the identifying information of the switching button control, performing the step of generating the first simulation event based on the configuration information of the switching button control for simulating trigger of the switching button control.

4. The method according to claim 1, wherein the configuration information comprises: interface positional information and identifying information of the switching button control; and the method further comprises:

acquiring identifying information of a target control corresponding to the interface positional information on the first user interface; and when the identifying information of the target control does not match the identifying information of the switching button control, updating the configuration information with a background server.

5. The method according to claim 1, wherein the configuration information comprises: a first version number; and the method further comprises:

acquiring a second version number of the shooting program; and when the first version number is different from the second version number, updating the configuration information with a background server.

6. The method according to claim 1, wherein the acquiring a first cover slide event indicating that the slide rear cover is slid out comprises:

monitoring the first cover slide event indicating that the slide rear cover is slid out by a cover slide event controller; and acquiring the first cover slide event from the cover slide event controller.

7. The method according to claim 1, further comprising:

acquiring an action at a stack top of an action stack, the action being used for indicating a foreground display interface on the terminal; and when the action indicates the foreground display interface is the first user interface, performing the step of acquiring a first cover slide event indicating that the slide rear cover is slid out.

8. The method according to claim 7, further comprising: acquiring a second cover slide event indicating that the slide rear cover is slid in; and
controlling, based on the second cover slide event, the shooting program to switch the second user interface to the first user interface.

9. A shooting interface switching apparatus, applied to a terminal with a front camera and a rear camera being respectively arranged on a front surface and a rear surface of a slide rear cover, the apparatus comprising:
a processor; and
a memory arranged to store an instruction executable by the processor,
wherein the processor is arranged to:
display a first user interface that enables a shooting program to shoot a photo using the rear camera on the terminal;
acquire a first cover slide event indicating that the slide rear cover is slid out; and
control, based on the first cover slide event, the shooting program to switch the first user interface to a second user interface that enables the shooting program to shoot a photo using the front camera, wherein the first user interface for the rear camera is switched to the second user interface for the front camera when a switching control program receives the first cover slide event upon monitoring the first cover slide event, and wherein to control the shooting program to switch the first user interface to the second user interface, the processor is further arranged to:
acquire configuration information corresponding to a switching button control in the shooting program from a configuration file, the switching button control being a control for switching the front camera and the rear camera;
generate a first simulation event based on the configuration information of the switching button control, wherein the first simulation event is a click simulation event generated by an operating system when a user clicks a screen position corresponding to an interface position of the switching button control on a touch screen; and
send the first simulation event to the shooting program, the first simulation event being used for triggering the shooting program to switch the first user interface to the second user interface.

10. The apparatus according to claim 9, wherein the configuration information comprises: interface positional information of the switching button control, the interface positional information being used for indicating positional coordinates of the switching button control on the first user interface; and wherein in order to generate the first simulation event based on the configuration information of the switching button control for simulating trigger of the switching button control, the processor is arranged to:
generate, based on the interface positional information of the switching button control, the first simulation event for simulating click of the switching button control.

11. The apparatus according to claim 10, wherein the configuration information comprises interface positional information and identifying information of the switching button control; and in order to control the shooting program to switch from the first user interface to the second user interface that enables the shooting program to shoot a photo using the front camera, the processor is arranged to:
acquire identifying information of a target control corresponding to the interface positional information on the first user interface; and
when the identifying information of the target control matches the identifying information of the switching button control, perform the step of generating the first simulation event based on the configuration information of the switching button control for simulating trigger of the switching button control.

12. The apparatus according to claim 10, wherein the configuration information comprises: interface positional information and identifying information of the switching button control; and in order to control the shooting program to switch from the first user interface to the second user interface that enables the shooting program to shoot a photo using the front camera, the processor is arranged to:
acquire identifying information of a target control corresponding to the interface positional information on the first user interface; and
when the identifying information of the target control does not match the identifying information of the switching button control, update the configuration information with a background server.

13. The apparatus according to claim 10, wherein the configuration information comprises: a first version number; and in order to control the shooting program to switch from the first user interface to the second user interface that enables the shooting program to shoot a photo using the front camera, the processor is arranged to:
acquire a second version number of the shooting program; and
when the first version number is different from the second version number, update the configuration information with a background server.

14. The apparatus according to claim 10, wherein in order to acquire a first cover slide event indicating that the slide rear cover is slid out, the processor is arranged to:
monitor the first cover slide event indicating that the slide rear cover is slid out by a cover slide event controller, and acquire the first cover slide event from the cover slide event controller.

15. The apparatus according to claim 9, wherein in order to acquire a first cover slide event indicating that the slide rear cover is slid out, the processor is arranged to:
acquire an action at a stack top of an action stack, the action being used for indicating a foreground display interface on the terminal; and when the action indicates the foreground display interface is the first user interface, perform the step of acquiring a first cover slide event indicating that the slide rear cover is slid out.

16. The apparatus according to claim 15, wherein in order to acquire a first cover slide event indicating that the slide rear cover is slid out, the processor is arranged to:
acquire a second cover slide event indicating that the slide rear cover is slid in; and
in order to control, based on the first cover slide event, the shooting program to switch from the first user interface to the second user interface that enables the shooting program shoots a photo using the front camera, the processor is arranged to:
control, based on the second cover slide event, the shooting program to switch the second user interface to the first user interface.

17. A non-transitory computer-readable storage medium having stored therein instructions that, when executed by a processor, causes the processor to perform a shooting interface switching method, the method being applied to a terminal with a front camera and a rear camera being respectively arranged on a front surface and a rear surface of a slide rear cover, and the method comprising:

displaying a first user interface that enables a shooting program to shoot a photo using the rear camera on the terminal;

acquiring a first cover slide event indicating that the slide rear cover is slid out; and controlling, based on the first cover slide event, the shooting program to switch the first user interface to a second user interface that enables the shooting program to shoot a photo using the front camera, wherein the first user interface for the rear camera is switched to the second user interface for the front camera when a switching control program receives the first cover slide event upon monitoring the first cover slide event, and wherein controlling the shooting program to switch the first user interface to the second user interface comprises:

acquiring configuration information corresponding to a switching button control in the shooting program from a configuration file, the switching button control being a control for switching the front camera and the rear camera;

generating a first simulation event based on the configuration information of the switching button control, wherein the first simulation event is a click simulation event generated by an operating system when a user clicks a screen position corresponding to an interface position of the switching button control on a touch screen; and sending the first simulation event to the shooting program, the first simulation event being used for triggering the shooting program to switch the first user interface to the second user interface.

* * * * *